(12) United States Patent
Liebenow et al.

(10) Patent No.: US 6,910,137 B2
(45) Date of Patent: Jun. 21, 2005

(54) SYSTEM, METHOD, AND SOFTWARE FOR REMOVABLE-MEDIA SECURITY

(75) Inventors: Frank Liebenow, Dakota Dunes, SD (US); Carrie A. Carlson, Sioux City, IA (US)

(73) Assignee: Gateway, Inc., Irvine, CA (US)

( * ) Notice: Subject to any disclaimer, the term of this patent is extended or adjusted under 35 U.S.C. 154(b) by 61 days.

(21) Appl. No.: 10/106,596

(22) Filed: Mar. 26, 2002

(65) Prior Publication Data

US 2002/0104028 A1 Aug. 1, 2002

Related U.S. Application Data

(63) Continuation of application No. 09/177,865, filed on Oct. 23, 1998, now abandoned.

(51) Int. Cl.$^7$ .............................. H04L 9/32; G06F 1/16
(52) U.S. Cl. ....................................... 713/202; 361/685
(58) Field of Search ................................ 713/200, 202, 713/300, 310, 320, 324; 711/163, 164; 361/683–686, 724–727

(56) References Cited

U.S. PATENT DOCUMENTS

| | | | | |
|---|---|---|---|---|
| 5,375,243 A | * | 12/1994 | Parzych et al. ............. | 713/202 |
| 5,568,611 A | * | 10/1996 | Khatri et al. ................ | 713/200 |
| 5,898,458 A | * | 4/1999 | Sakui ......................... | 348/151 |
| 5,911,042 A | * | 6/1999 | Kugue ........................ | 713/202 |
| 5,923,841 A | * | 7/1999 | Lee ............................. | 713/202 |
| 5,935,244 A | * | 8/1999 | Swamy et al. ............... | 713/200 |
| 5,949,882 A | * | 9/1999 | Angelo ........................ | 713/185 |
| 5,960,084 A | * | 9/1999 | Angelo ........................ | 713/185 |
| 5,974,016 A | * | 10/1999 | Andrews et al. ............. | 369/75.1 |
| 5,974,473 A | * | 10/1999 | Leavitt et al. ................ | 710/8 |
| 5,978,018 A | * | 11/1999 | Sakui ......................... | 348/151 |
| 6,012,146 A | * | 1/2000 | Liebenow .................... | 713/202 |
| 6,181,663 B1 | * | 1/2001 | Kakuta et al. .............. | 369/77.1 |
| 6,286,087 B1 | * | 9/2001 | Ito et al. ...................... | 711/164 |
| 6,400,823 B1 | * | 6/2002 | Angelo ........................ | 380/255 |
| 6,529,382 B2 | * | 3/2003 | Terao .......................... | 361/726 |
| 6,738,877 B1 | * | 5/2004 | Yamakawa et al. ......... | 711/164 |
| 2002/0166072 A1 | * | 11/2002 | Cromer et al. .............. | 713/202 |

OTHER PUBLICATIONS

"Hard Disk Drive Access Password Support for Power Management", Dec. 1, 1994, IBM Technical Disclosure Bulletin, p. 1–3.*

* cited by examiner

Primary Examiner—Emmanuel L. Moise
Assistant Examiner—Christopher Revak
(74) Attorney, Agent, or Firm—Jeffrey A Proebl (57) ABSTRACT

A system and method for preventing access to a drive opening of a disk drive or unauthorized removal of a disk from the disk drive opening. The system comprises a drive having a drive opening and a disk tray movable between a retracted position preventing access to the opening and extended position allowing access to the opening. A software or hardware security module prevents the disk tray from being moved to the extended position to prevent access to the drive opening. The method for preventing a disk from being removed from a drive includes determining whether the disk is in the drive, determining whether a correct password has been entered, and preventing ejection of the disk by an ejector based upon those determinations.

52 Claims, 10 Drawing Sheets

SYSTEM, METHOD, AND SOFTWARE FOR REMOVABLE-MEDIA SECURITY

CROSS REFERENCE TO RELATED APPLICATIONS

The present application Con. of claims priority under 35 U.S.C. §120 to U.S. Patent application Ser. No. 09/177,865, filed Oct. 23, 1998, which is now abandoned which is herein incorporated by reference in its entirety.

FIELD OF THE INVENTION

The present invention relates in general to security systems, methods and software for preventing unauthorized removal of a medium from a drive configured to read from or write to the medium and for preventing access to a drive opening.

BACKGROUND OF THE INVENTION

Many computers come equipped with a CD-ROM (Compact Disc Read-Only Memory), music CD, DVD (Digital Versatile Disk), or other removable-media drives that have both a motor operated and mechanically operated emergency eject mechanism. The motor-operated eject mechanism is generally actuated by a hardware eject button or a software implemented eject button, whereas the mechanical eject mechanism is generally actuated using a paper clip which is inserted into an emergency eject hole. If the user has a CD loaded in a CD-ROM drive, it would be a trivial activity for an unauthorized user to remove the CD from the drive by actuating the hardware or software eject button or inserting a paper clip into the emergency eject hole. Also, foreign objects can easily be placed in removable media drives causing damage to the drives, and such drives do not prevent the inadvertent removal of a medium while data is being written to the medium.

What is needed is a system, method, and software for making the removal of a medium, such as a CD, from a drive configured to read from or write to the medium a little more difficult, so the casual "borrower" will be discouraged. Also, a system, method, and software are needed for preventing access to a drive opening so as to prevent foreign objects from being placed in the drive opening, avoid inadvertent removal of a medium while data is being written/read to/from the medium, or for other security purposes.

SUMMARY OF THE INVENTION

Accordingly, the present invention provides a drive system comprising a drive having a drive opening and a component movable between a first position for allowing access to the opening and a second position for preventing access to the opening. The drive system also includes a security module configured to prevent the component from being moved to the first position to thereby prevent access to the opening.

The present invention also provides a drive system comprising a drive configured to read from or write to at least one medium in the drive. For example, the medium may be a CD-ROM disk, a DVD disk, 5.25-inch or 3.5-inch magnetic disks with the corresponding CD-ROM, DVD-ROM, 5.25-inch or 3.5-inch drives or other removable-media drives such as the Iomega ZIP drive (Iomega and ZIP are trademarks of Iomega Corporation). The drives may or may not include drive trays or drawers for holding the medium. The drive system also includes an ejector configured to eject the medium from the drive. In one embodiment, the ejector is an electrically operated motorized ejector. The system further includes a controller configured to activate or deactivate the ejector wherein the ejector ejects the medium from the drive when the controller activates the ejector and a security module configured to prevent the controller from activating the ejector to thereby prevent the medium from being ejected from the drive. In one embodiment, the security module is implemented in software, and in another embodiment, the security module is implemented as a hardware device(s).

The present invention also provides an information handling system comprising at least one processor, memory operably associated with the processor, a drive having a drive opening and a component movable between a first position allowing access to the opening and a second position preventing access to the opening, and a security module configured to prevent the component from being moved to the first position to thereby prevent access to the opening.

The present invention also provides an information handling system comprising at least one processor and memory operably associated with the processor. The processor may, for example, be a Pentium processor (Pentium is a trademark of Intel Corporation), and the memory may include a random access memory (RAM), dynamic random access memory (DRAM), hard drive or the like. The system further includes a drive configured to read from or write to at least one medium in the drive, an ejector configured to eject the medium from the drive, a controller configured to activate or deactivate the ejector wherein the ejector ejects the medium from the drive when the controller activates the ejector, and a security module configured to prevent the controller from activating the ejector to thereby prevent the medium from being ejected from the drive. In one embodiment, the processor is the controller, and the security module is a software program storable in the memory.

The present invention further provides a method for preventing a medium from being removed from a drive configured to read from or write to the medium. The method comprises the steps of:

(a) determining whether the medium is in the drive;

(b) determining whether a correct password has been entered; and (c) preventing ejection of the medium by an ejector configured to eject the medium from the drive based upon the determinations made in steps (a) and (b).

The present invention also provides a computer readable medium tangibly embodying a program of instructions which implement the method above.

The present invention provides the advantages of preventing an unauthorized user from removing media from a drive and preventing access to a drive opening.

BRIEF DESCRIPTION OF THE DRAWINGS

Other objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

DETAILED DESCRIPTION OF A PREFERRED EMBODIMENT OF THE INVENTION

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Generally, the present invention provides a media drive, such as a CD-ROM drive, having a component, such as a CD-ROM tray or drawer, movable between a first position allowing access to a drive opening and a second position preventing access to the opening which includes a security module for preventing the component from being moved to the first position to prevent access to the opening. The present invention also provides a software-controllable motor-operated eject mechanism but has no emergency eject mechanism or hardware eject button. The present invention also provides a media drive that has a hardware eject button that does not eject the media unless a software program enables such. Furthermore, the present invention provides a separate software application or software program part of a media control application that enables the hardware eject button to excite or actuate the motorized eject mechanism or to discourage unauthorized borrowing of the media by either not allowing the eject mechanism to operate until a password is entered or, when the hardware eject button is pressed, present the user with a request for a password.

Figure 1:
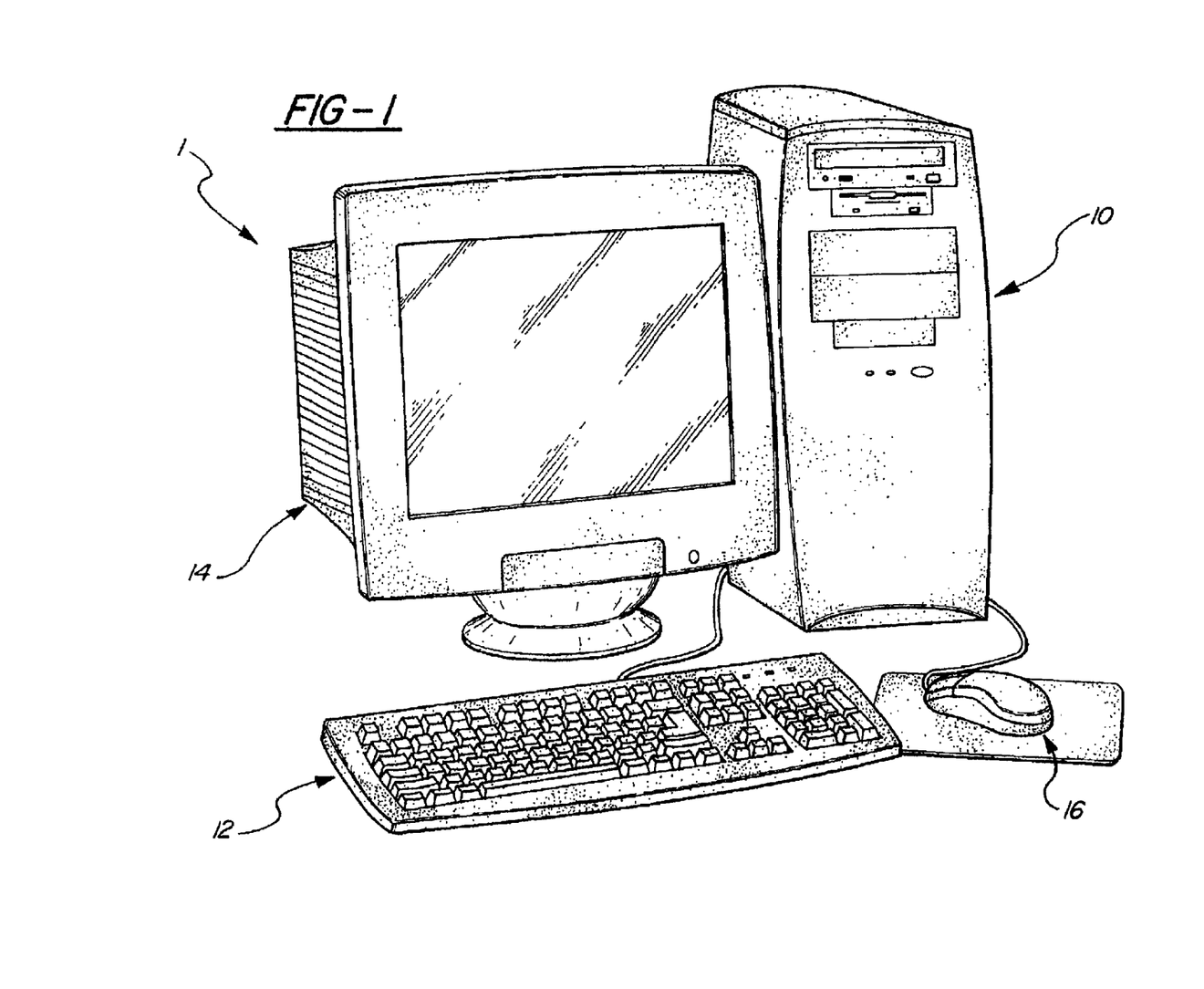
FIG. 1 is a perspective view of an information handling system in which the present invention is embodied.

Referring now to FIG. 1, a representative hardware environment for practicing the present invention is shown including an information handling system 1 including a computer 10, such as a Gateway computer. (Gateway and Gateway 2000 are trademarks of Gateway 2000, Inc.) Preferably, computer 10 is running a Microsoft Windows operating system such as Windows 95 or Windows 98 (Windows, Windows 95 and Windows 98 are trademarks of Microsoft Corporation.) However, it will be apparent to one skilled in the art that the present invention may be practiced without the specific details and be implemented in various computer systems utilizing various operating systems and in various configurations or makes or models of tightly coupled processors or in various configurations of loosely coupled multiprocessor systems.

Information handling system 1, as shown in FIG. 1, includes a keyboard 12, display device 14, and mouse pointing device 16 operatively coupled to computer 10. Keyboard 12 permits entry of textual information into the computer via depression of one or more of a plurality of keys. Mouse pointing device 16 is an input device permitting control over the graphical user interface of the operating system (e.g., a Microsoft Windows operating system). For example, mouse pointing device 16 permits a user to control the movement of a pointer within the graphical user interface. The invention is not limited to any particular pointing device 16. Other devices include a touch pad, a wheel, a trackball, and a joystick. Display device 14 permits display of information by the computer and preferably includes a speaker to make audible other information from the computer. The invention is not limited to any particular display device 14. In the case of a non-portable computer 10, display device 14 is preferably a monitor housing a cathode-ray tube (CRT).

Figure 2:
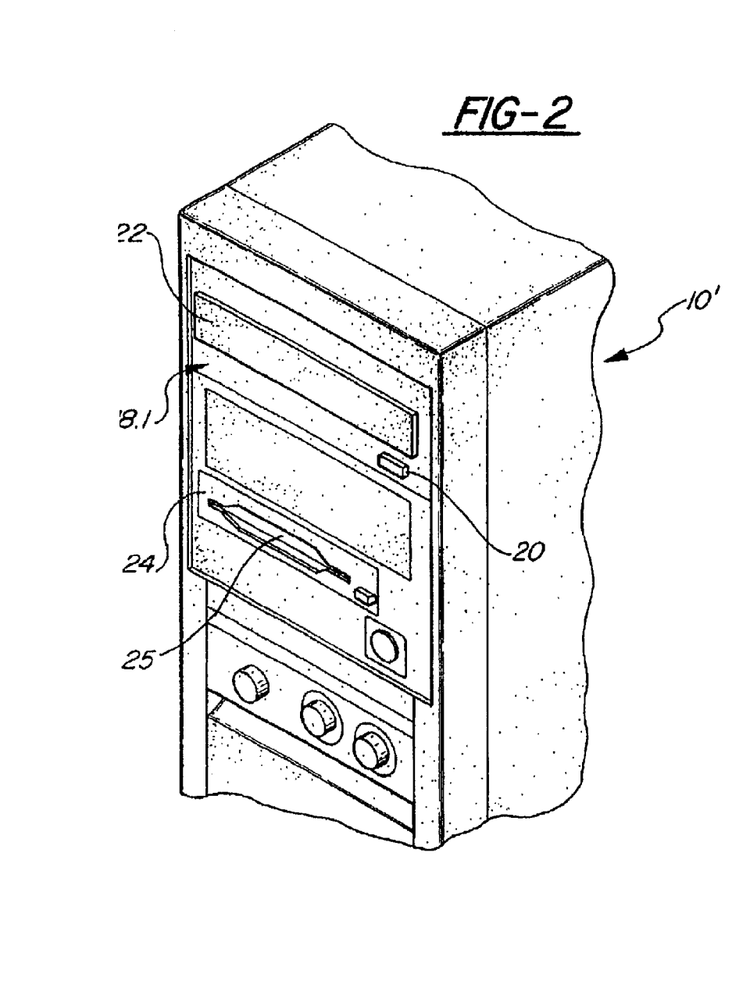
FIG. 2 is a partial perspective view of a computer including a drive system having a media-eject button according to one embodiment of the present invention, wherein a CD-ROM drive tray or drawer is shown in the retracted or closed position.

Referring now to FIG. 2, a partial perspective view of a computer 10' including a drive system 18.1 having a media eject button 20 according to one embodiment of the present invention is shown. Drive system 18.1 includes a CD-ROM drive, such as those manufactured and supplied by Goldstar, Panasonic or Seagate, for a CD-ROM disk 26 (shown in FIG. 3). The CD-ROM drive includes a component, such as a drive tray or drawer 22, as shown in the retracted, or closed, position for preventing access to a drive opening 28 (shown in FIG. 3). It will be appreciated that the drive system of the present invention may include other drives other than a CD-ROM drive and that a CD-ROM drive is shown for illustrative purposes. For example, the drive system of the present invention may include DVD-ROM, 5.25-inch or 3.5-inch drives or other removable-media drives such as the Iomega ZIP drive. In fact, FIG. 2 illustrates one such drive, a 3.5-inch magnetic disk drive 24 having a component, such as a drive door 25, movable between a first position allowing access to a drive opening (not shown) for receiving a 3.5-inch disk and a second position preventing access to the opening. It is to be noted that drive system 18.1 does not include an emergency eject hole for actuating a mechanical eject mechanism using a paper clip which is inserted into the hole as discussed in the Background of the Invention.

Figure 3:
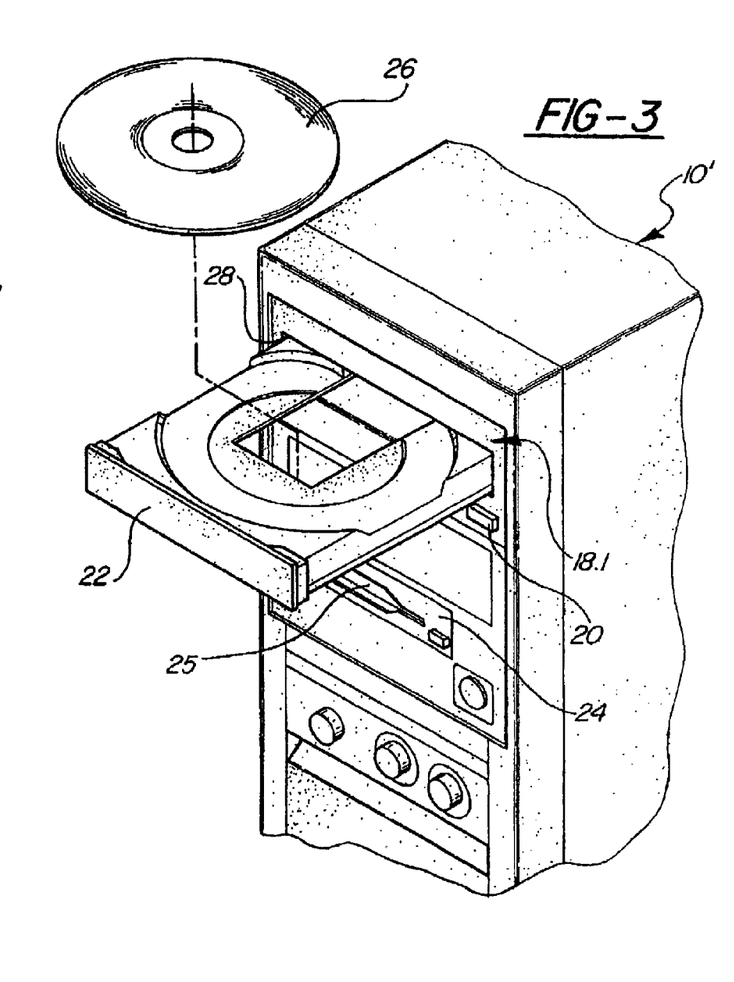
FIG. 3 is a partial perspective view of a computer including a drive system having a media-eject button according to one embodiment of the present invention wherein a CD-ROM drive tray or drawer is shown in the extended or open position.

Referring now to FIG. 3, wherein reference numerals which are like, similar, or identical to reference numerals in FIG. 2 indicate like, similar, or identical components, a partial perspective view of a computer 10' including a drive system 18.1 having a media eject button 20 is shown. CD-ROM drive tray or drawer 22 is shown in the extended, or open, position allowing access to a drive opening 28, with CD-ROM disk 26 shown removed from drive opening 28 and removed from drawer 22. Drive opening 28 includes a removable media slot dimensioned to receive at least one removable medium. It is to be understood that the present invention applies equally for all types of removable media and their corresponding drives and that a CD-ROM medium or disk 26 and drive are shown and described for illustrative purposes.

Figure 4:
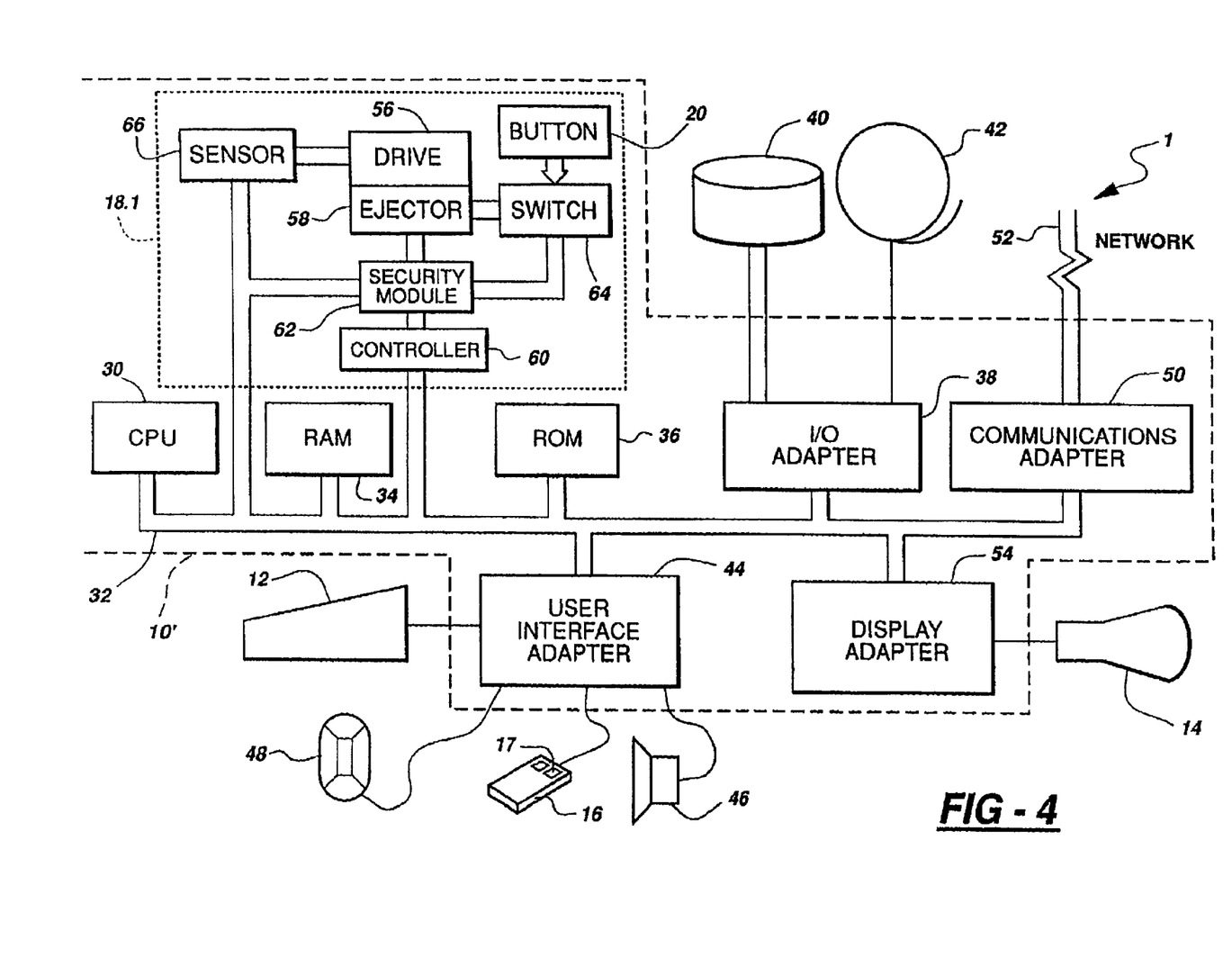
FIG. 4 is a block diagram of an information handling system including the drive system of FIGS. 2 and 3 according to one embodiment of the present invention.

Referring now to FIG. 4, wherein reference numerals which are like, similar, or identical to reference numerals used in FIGS. 1–3 indicate like, similar, or identical components, information handling system 1 including a drive system 18.1 according to one embodiment of the present invention is shown. Information handling system 1 includes at least one central processing unit (CPU) 30. CPU 30 is interconnected via at least one bus 32 to random access memory (RAM) 34, read-only memory (ROM) 36, and input/output (I/O) adapter 38 for connecting peripheral devices such as disk units 40 and tape drives 42 to bus 32, user interface adapter 44 for connecting keyboard 12, mouse 16 having button 17, speaker 46, microphone 48, and/or other user interfaced devices such as a touch screen device (not shown) to bus 32, communication adapter 50 for connecting the information handling system 1 to an information network 52, such as the Internet, and display adapter 54 for connecting bus 32 to display device or monitor 14.

Still referring to FIG. 4, drive system 18.1 is shown according to one embodiment of the invention. Drive system 18.1 includes a drive 56 configured to read from or write to at least one medium 26 in drive 56. For example, CD-ROM drive shown in FIGS. 2 and 3 reads from CD-ROM 26 when drawer or tray 22 is in the retracted, or closed, position, and CD-ROM 26 is located inside drawer 22 and inside drive opening 28 such that a disk reader (not shown) aligns with the CD-ROM 26. Drive system 18.1 further includes an ejector 58 configured to eject medium 26 from drive 56. In one embodiment, ejector 58 is a motorized ejector which forces tray 22 to the extended, or open, position to thereby eject tray or drawer 22 and CD-ROM 26 deposed therein from opening 28 so that CD-ROM 26 is no longer completely in opening 28 of drive 56, i.e., in drive 56. Ejector 58 may or may not be packaged with drive 56. One example of a motorized ejector can be found in the CD-ROM drives manufactured by Goldstar, Panasonic or Seagate. A controller 60 is configured to activate or deactivate ejector 58, wherein ejector 58 ejects medium 26 from drive 56 when controller 60 activates ejector 58.

Drive system 18.1 further includes security module 62 configured to prevent drawer 22 from being moved to the retracted or closed position to prevent access to drive opening 28. In the preferred embodiment, security module 62 is configured to prevent controller 60 from activating ejector 58 to thereby prevent medium 26 from being ejected from drive 56 according to the present invention. Drive system 18.1 also includes a user-controlled switch 64 operably coupled to button 20, ejector 58, and security module 62 to activate or deactivate ejector 58 in response to actuation of button 20 by a user. A sensor 66 is operably coupled to drive 56, bus 32, and security module 62 for detecting or determining the presence of medium 26 in drive 56 when tray or drawer 22 is in the retracted or closed position. In one embodiment, sensor 66 may be a photo optical or capacitive sensor or other sensors well known in the art. Sensor 66 relays its information (namely, a signal indicating the presence of medium 26 in drive 56) from drive 56 to security module 62 to bus 32, wherein this information becomes available to those components coupled to bus 32 such as CPU 30 and controller 60. Security module 62 couples controller 60 to ejector 58. In one embodiment, security module 62 is configured to prevent controller 60 from activating ejector 58 when a password is set. The password may be an alphanumeric code set or stored in memory such as RAM 34 or ROM 36. Security module 62 is also configured to allow controller 60 to activate ejector 58 regardless of whether the password is set when medium 26 is not in drive 56 as detected or determined by sensor 66. In another embodiment, security module 62 is configured to prevent controller 60 from activating ejector 58 when a password is set and medium 26 is in drive 56. Security module 62 may also be configured to disable switch 64 to thereby prevent switch 64 from activating ejector 58 when a password is set. Security module 62 may also be configured to enable switch 64 regardless of whether the password is set when medium 26 is not in drive 56 as detected by sensor 66. In another embodiment, security module 62 may be configured to disable switch 64 to thereby prevent switch 64 from activating ejector 58 when a password is set and the medium 26 is in drive 56.

Figure 5:
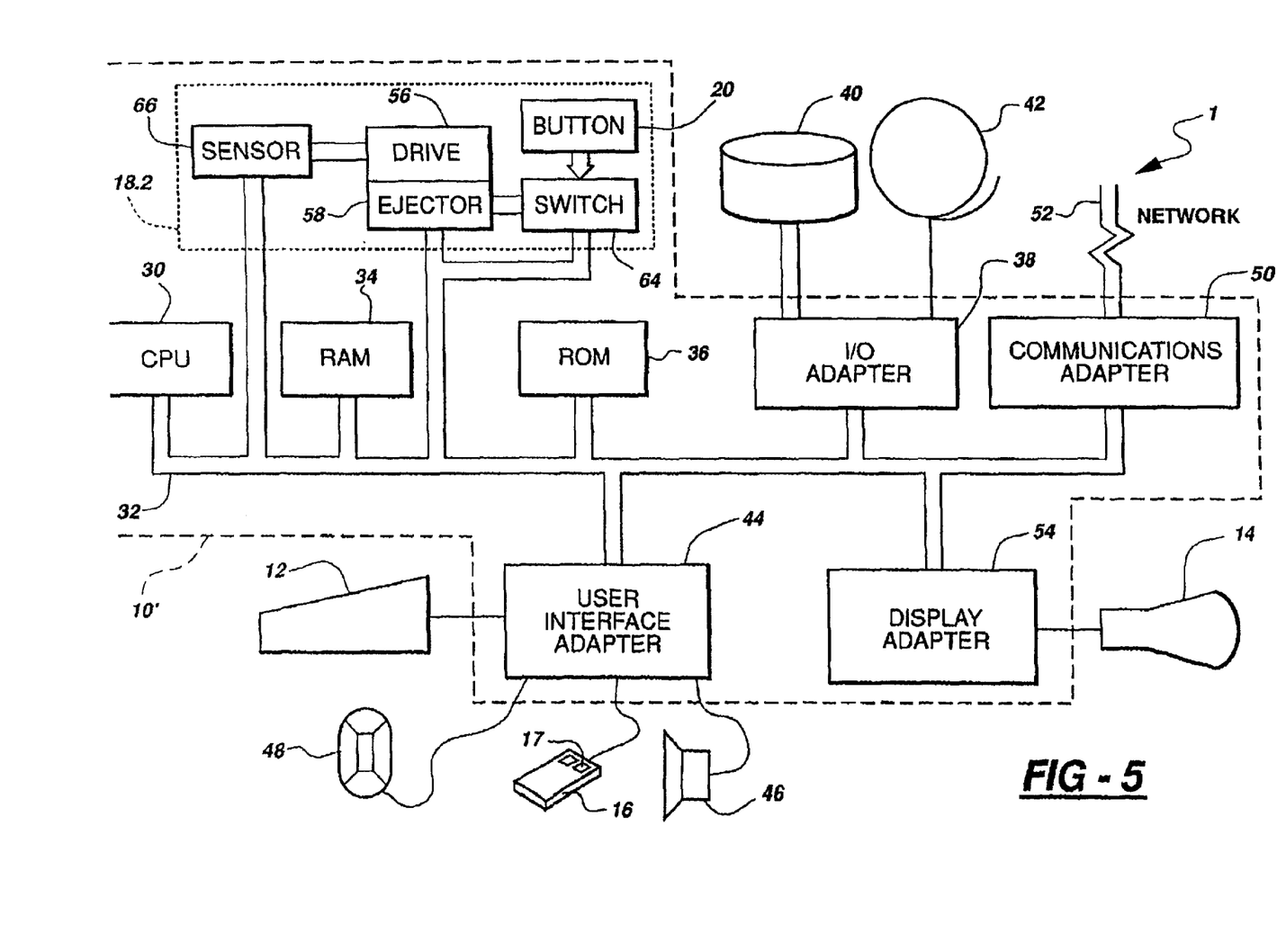
FIG. 5 is a block diagram of an information handling system including the drive system of FIGS. 2 and 3 according to another embodiment of the present invention.
Figure 6:
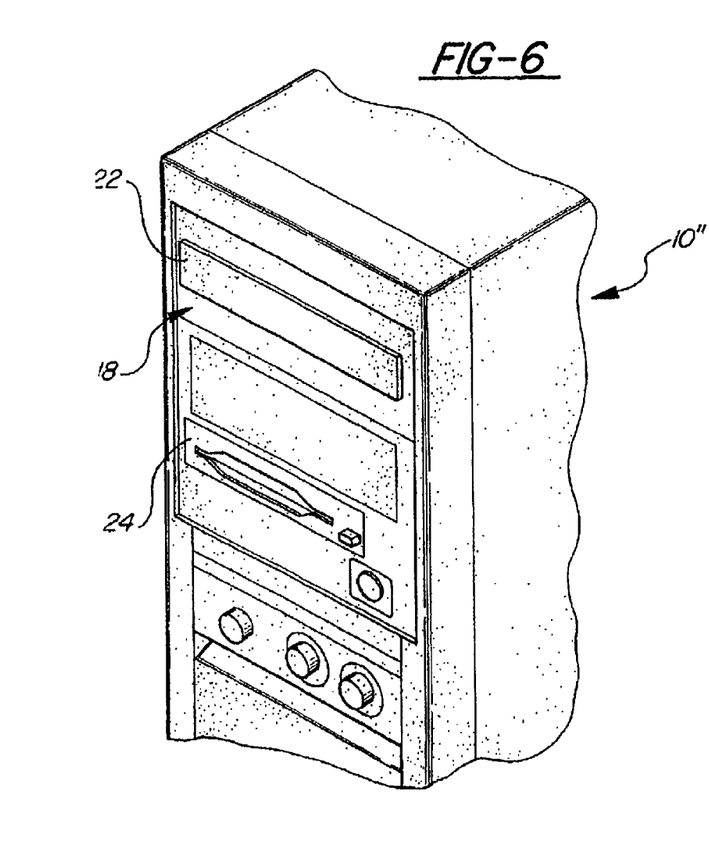
FIG. 6 is a partial perspective view of a computer including a drive system without a media-eject button according to one embodiment of the present invention, wherein a CD-ROM drive tray or drawer is shown in the retracted or closed position.
Figure 7:
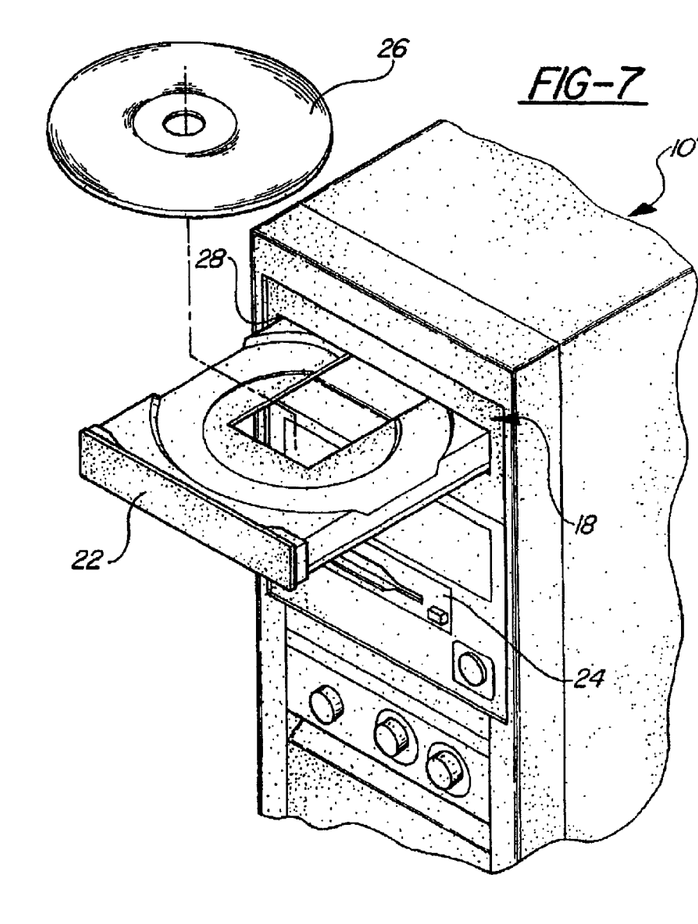
FIG. 7 is a partial perspective view of a computer including a drive system without a media-eject button according to one embodiment of the present invention wherein a CD-ROM drive tray or drawer is shown in the extended or open position.
Figure 8:
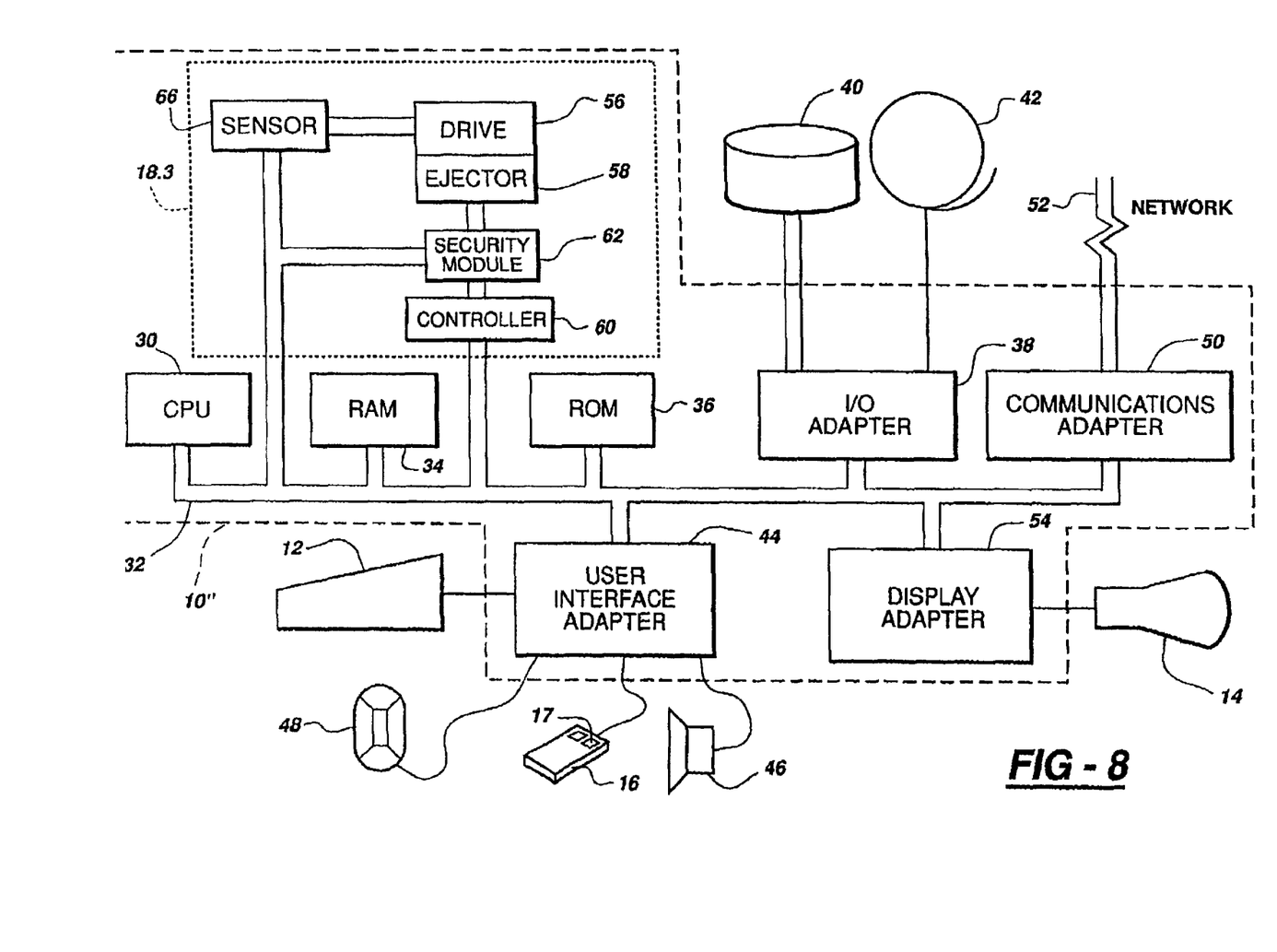
FIG. 8 is a block diagram of an information handling system including the drive system of FIGS. 6 and 7 according to one embodiment of the present invention.
Figure 9:
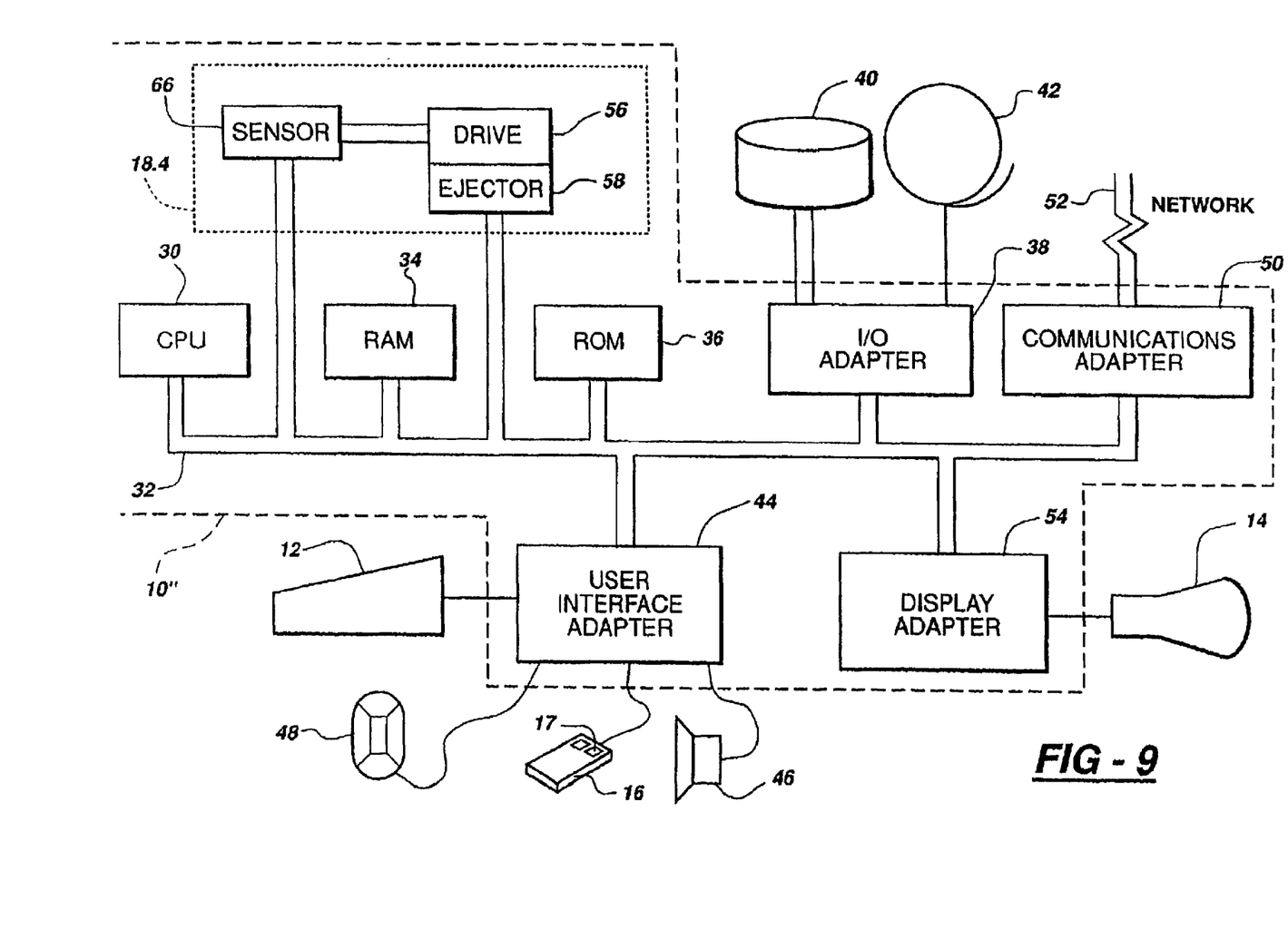
FIG. 9 is a block diagram of an information handling system including the drive system of FIGS. 6 and 7 according to another embodiment of the present invention.

Referring now to FIG. 5, wherein reference numerals which are like, similar, or identical to reference numerals used in FIGS. 1–4 indicate like, similar, or identical components, a block diagram of an information handling system 1 including a drive system 18.2 according to another embodiment of the present invention is shown. In this embodiment, ejector 58 and switch 64 are coupled directly to bus 32, and CPU 10 and a program of instructions executable by CPU 10 are stored in memory such as RAM 16 or ROM 14 to perform the functions of security module 62 and controller 60 described in connection with FIG. 4. In other words, a program of instructions is stored in memory, such as RAM 16 or ROM 14, and executed by CPU 10 such that CPU 10 controls ejector 58 and switch 64 based upon information received from sensor 66 and password information stored in memory such as RAM 16 or ROM 14.

FIGS. 6–9 are identical to FIGS. 2–5, respectively, except that computer 10" includes a drive system without a media eject button 20. In these embodiments, a user controls ejector 58 by a software-implemented button subject to the functions of security module 62 and controller 60 described in connection with FIGS. 4 and 5.

Figure 10:
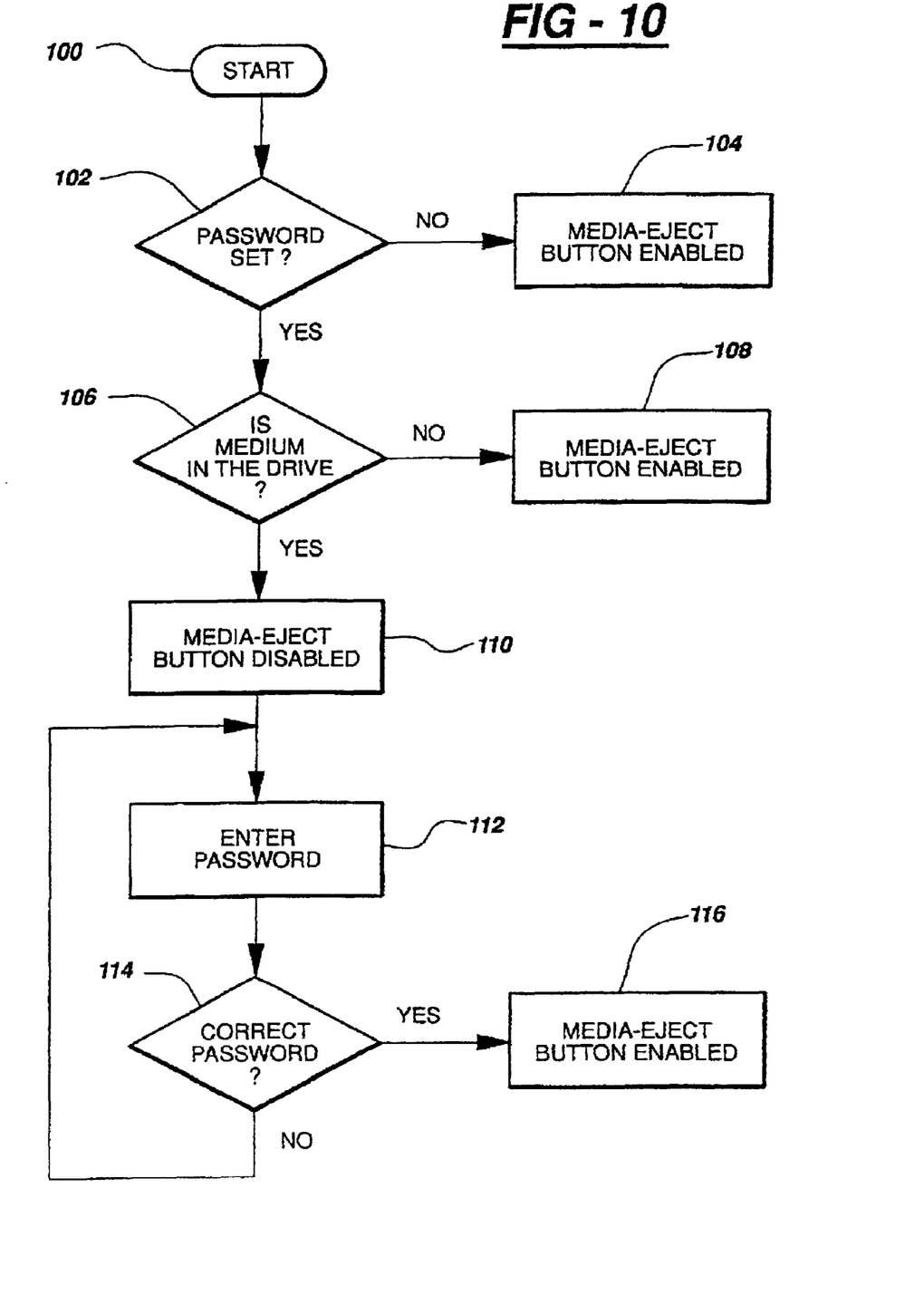
FIG. 10 is a flow chart illustrating one method according to the present invention.

Referring now to FIG. 10, a flow chart illustrating one method according to the present invention is shown. The method illustrated in FIG. 10 is preferably implemented in the embodiments shown in FIGS. 2–5. In the following method, an "enabled" media eject button 20 means that a user can actuate button 20 to cause switch 64 to activate ejector 58 to force drawer or tray 22 to the open, or extended, position. A "disabled" media eject button 20 means that actuation of button 20 or switch 64 does not activate ejector 58 and otherwise has no effect. The method starts with step 100. In step 102, a determination of whether a password has been set is made. If a password has not been set, then media eject button 20 is enabled in step 104. If a password is set, the process proceeds to step 106. In step 106, a determination is made whether a medium 26 is in drive 56. This can be accomplished using sensor 66. If there is no medium 26 in the drive, the method proceeds to step 108 where the media eject button 20 is enabled. If a medium 26 is in drive 56, then the method proceeds to step 110 wherein the media eject button 20 is disabled. In step 112, a user enters a password. For example, the user may enter the password using keyboard 12. In step 114, a determination is made whether the user entered the correct password. Here CPU 30 may be used to compare the password entered by the user to a password set in memory, i.e., in RAM 34 or ROM 36. If the correct password was entered, the method proceeds to step 116 where the media eject button 20 is enabled. If an incorrect password has been entered by the user as determined in step 114, the method returns to step 112.

Figure 11:
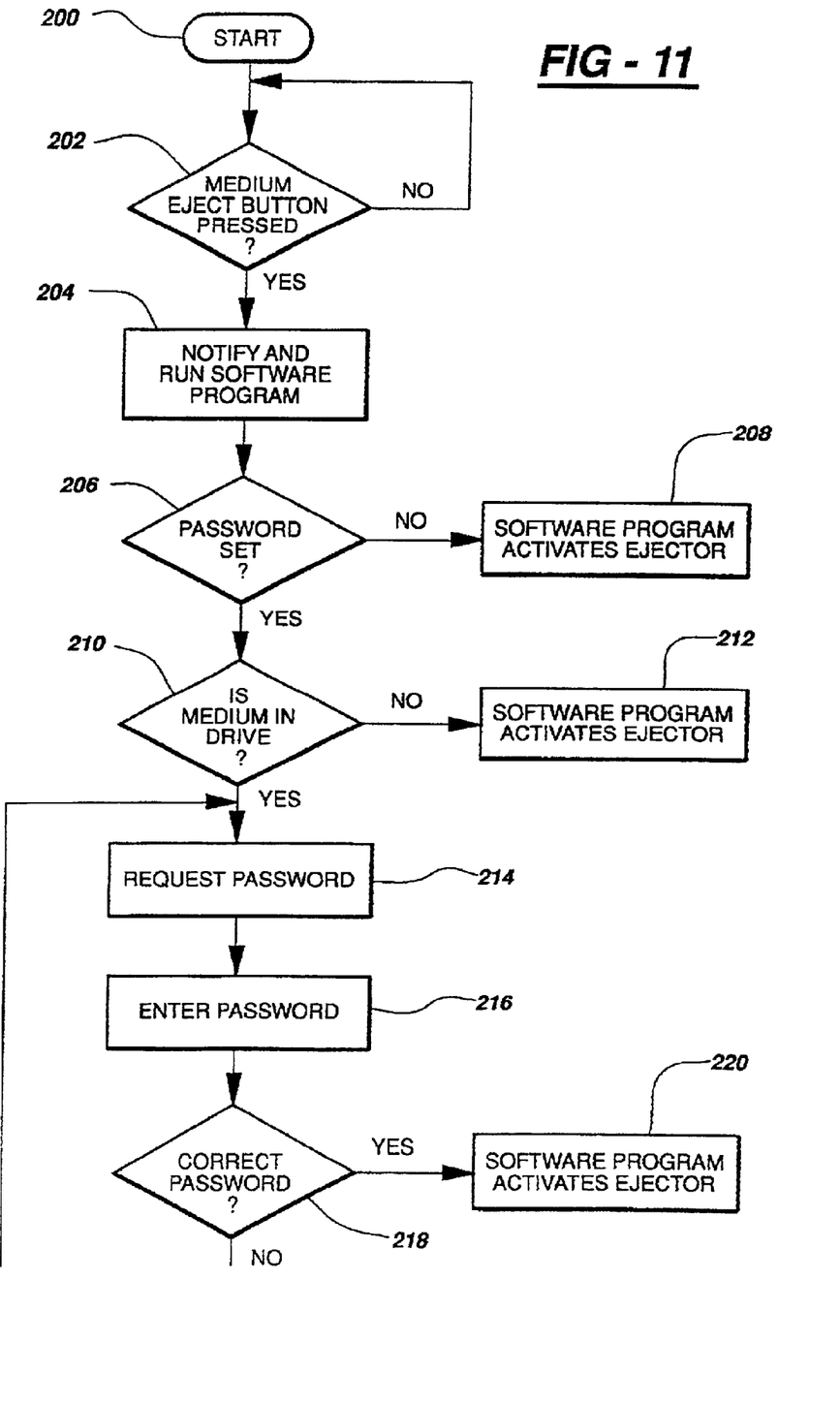
FIG. 11 is a flow chart illustrating another method according to the present invention.

Referring now to FIG. 11, a flow chart illustrating another method according to the present invention is shown. The method illustrated in FIG. 11 is preferably implemented by the embodiments shown in FIGS. 2–5. The method starts with step 200. In step 202, a determination is made whether the media eject button 20 has been pressed by a user. If the media eject button 20 has not been pressed, the method returns to step 200 until the media eject button 20 has been pressed. If the media eject button 20 has been pressed, the method proceeds to step 204 wherein a software program is notified that the media eject button 20 has been pressed, and the software program begins to run. In step 206, the software program determines whether a password has been set. If no password has been set, the method proceeds to step 208 wherein the software program activates ejector 58. If a password has been set, as determined in step 206, the method proceeds to step 210. In step 210, the software program determines whether medium 26 is in drive 56. If medium 26 is not in drive 56, the method proceeds to step 212, wherein the software program activates ejector 58. If medium 26 is in drive 56, then the method proceeds to step 214, wherein the software program requests a password from a user. In step 216, the user enters a password. In step 218, a determination is made whether the correct password has been entered. If the correct password has been entered, the method proceeds to step 220, wherein the software program activates ejector 58. If an incorrect password has been entered, as determined in step 218, the method returns to step 214, wherein the software prompts and requests the user for a password.

Figure 12:
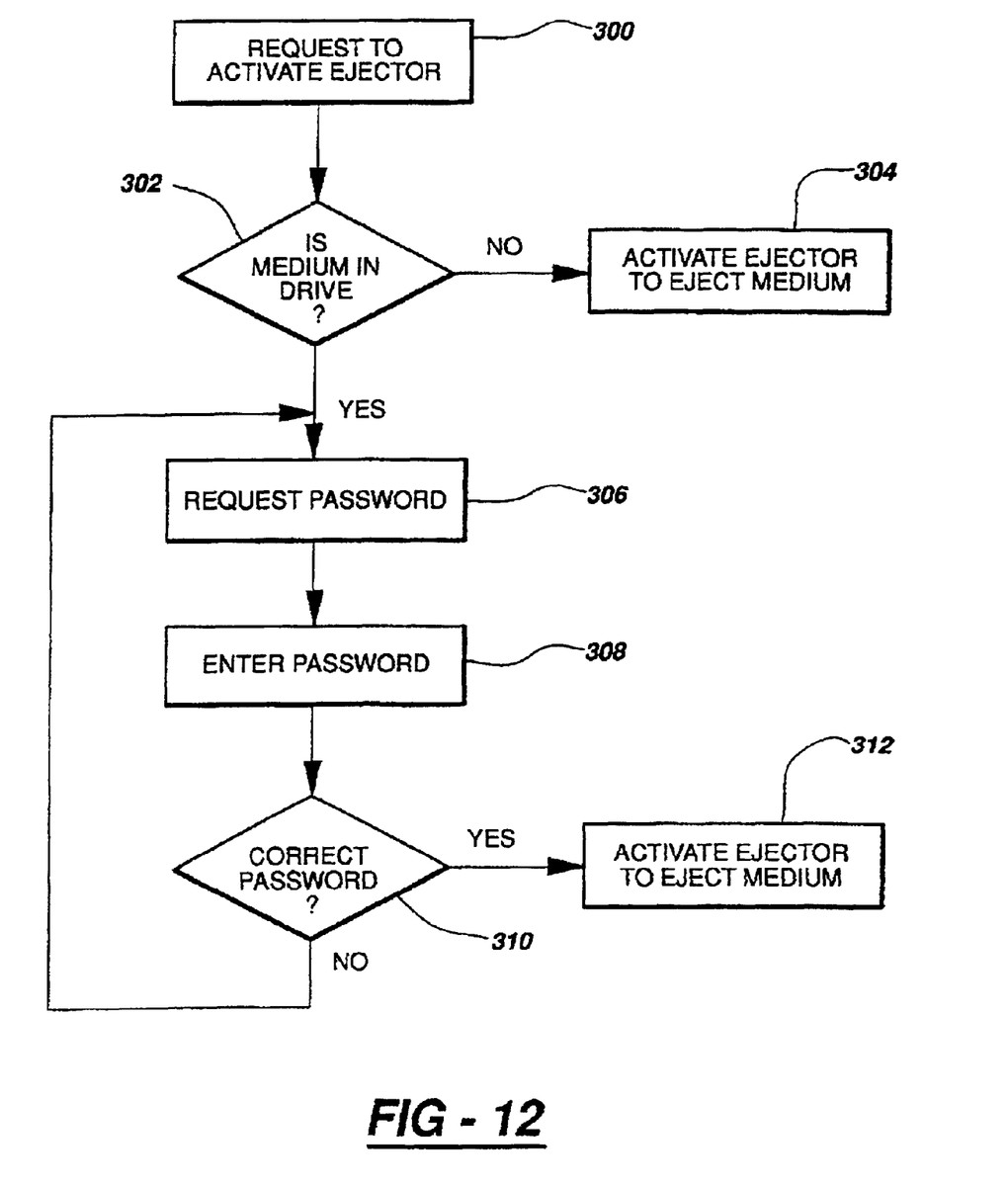
FIG. 12 is a flow chart illustrating yet another method according to the present invention.

Referring now to FIG. 12, a flow chart illustrating yet another method according to the present invention is shown. FIG. 12 is preferably implemented by the embodiments shown in FIGS. 6–9, wherein the drive system does not include a media eject button 20. The method starts in step 300 where a request to activate ejector 58 has been made. In step 302, a determination is made whether medium 26 is in drive 56. If medium 26 is not in drive 56, the method proceeds to step 304, wherein ejector 58 is activated to eject medium 26 from drive 56. If medium 26 is in drive 56, as determined in step 302, the method proceeds to step 306, wherein a request is made for a user to enter a password. In step 308, a user enters a password. In step 310, a determination is made whether the correct password has been entered. If the correct password has been entered by the user, the method proceeds to step 312, wherein ejector 58 is activated to eject medium 26. If an incorrect password has been entered by the user, as determined in step 310, the method returns to step 306, where a request for a new password is made.

Although an embodiment of the present invention has been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention.

Although the invention has been described with a certain degree of particularity, it should be recognized that elements thereof may be altered by persons skilled in the art without departing from the spirit and scope of the invention. One of the preferred implementations of the invention is as sets of instructions resident in the random access memory 34 of one or more computer or information handling systems configured generally as described in FIGS. 1–9. Until required by the computer system, the set of instructions may be stored in another computer readable memory, for example, in a hard disk drive or in a removable memory such as an optical disk for eventual use in a CD-ROM drive or a floppy disk for eventual use in a floppy disk drive. Further, the set of instructions can be stored in the memory of another computer and transmitted over a local area network or a wide area network, such as the Internet, when desired by the user. One skilled in the art would appreciate that the physical storage of the sets of instructions physically changes the medium upon which it is stored electrically, magnetically, or chemically so that the medium carries computer readable information. The invention is limited only by the following claims and their equivalents.

We claim:

1. A method for preventing a medium from being removed from a drive configured to read from and write to the medium, said method comprising the steps of:
    (a) determining whether the medium is in the drive upon reception of an ejection signal from a user, wherein the medium is selected from the group of a compact disc (CD) disk, a digital versatile disk (DVD) disk, a 5.25 inch disk, or a 3.5 inch disk;
    (b) requesting a password when the medium is in the drive; and
    (c) preventing ejection of the medium by an ejector configured to eject the medium from the drive based if an incorrect password has been entered.

2. The method, as recited in claim 1, wherein step (c) includes the step of preventing ejection of the medium from the drive if the medium is in the drive and if an incorrect password has been entered.

3. The method, as recited in claim 1, further including the step of determining, prior to steps (a)–(c), whether media-eject button has been pressed.

4. The method, as recited in claim 3, further including the step of notifying a software program if the media-eject button has been pressed.

5. The method, as recited in claim 4, further including the step of determining, by the software program, whether a password has been set.

6. The method, as recited in claim 5, further including the step of performing, by the software program, steps (a)–(c) if a password has been set.

7. The method, as recited in claim 5, further including the step of activating, by the software program, the ejector if a password has not been set.

8. The method, as recited in claim 5, further including the step of disabling the media-eject button if the password has been set and if the medium is in the drive.

9. The method, as recited in claim 8, further including the step of enabling the media-eject button if a correct password has been entered.

10. The method, as recited in claim 5, further including the step of locking the drive whenever a user closes a door of drive with the medium in the drive if the password has been set.

11. The method, as recited in claim 1, wherein step (c) includes disabling a media-eject button.

12. A computer readable medium tangibly embodying a program of instructions for preventing a removable medium from being removed from a drive configured to read from or write to the removable medium, said program of instructions implementing the following method:
 (a) determining whether the removable medium is in the drive upon reception of an ejection signal from a user, wherein the removable medium is selected from the group of a compact disc (CD) disk, a digital versatile disk (DVD) disk, a 5.25 inch disk, or a 3.5 inch disk;
 (b) requesting a password when the removable medium is in the drive; and
 (c) preventing ejection of the removable medium by an ejector configured to eject the removable medium from the drive based if an incorrect password has been entered.

13. The computer readable medium, as recited in claim 12, further including the step of determining, prior to steps (a)–(c), whether a media-eject button has been pressed.

14. The computer readable medium, as recited in claim 13, further including the step of notifying a software program if the media-eject button has been pressed.

15. The computer readable medium, as recited in claim 14, further including the step of determining, by the software program, whether a password has been set.

16. The computer readable medium, as recited in claim 15, further including the step of performing, by the software program, steps (a)–(c) if a password has been set.

17. The computer readable medium, as recited in claim 16, further including the step of disabling the media-eject button if the password has been act and if the medium is in the drive.

18. The computer readable medium, as recited in claim 17, further including the step of enabling the media-eject button if a correct password has been entered.

19. The computer readable medium, as recited in claim 16, further including the step of locking the drive whenever the user closes a door of the drive with the medium in the drive if the password has been set.

20. The computer readable medium, as recited in claim 18, further including the step of activating, by the software program, the ejector is a password has not been set.

21. The computer readable medium, as recited in claim 12, wherein step (c) includes disabling a media-eject button.

22. A media drive, comprising:
 a drive opening suitable for receiving a removable medium, the removable medium capable of storing electronic data, wherein the removable medium is selected from the group of a compact disc (CD) disk, a digital versatile disk (DVD) disk, a 5.25 inch disk, or a 3.5 inch disk;
 a component movable between a first position and a second position, wherein the first position allows access to a drive opening and the second position prevents access to the drive opening; and
 a security module suitable for controlling operation of the movable component, wherein access is permitted by the security module to the drive opening if a removable medium is not present in the drive opening and access to a removable medium is denied by the security module if a removable medium is present in the drive opening, the security module further suitable for requesting a password if access to the removable medium is denied due to presence of a removable medium in the drive opening.

23. The media drive as described in claim 22, further comprising a button suitable for actuation by a user to access the drive opening.

24. The media drive as described in claim 22, wherein the security module includes a sensor suitable for detecting presence of a removable medium in the drive opening.

25. The media drive as described in claim 22, wherein a correct password is not entered, the security module prevents the component from moving to the first position.

26. A method of providing access by a media drive having a drive opening suitable for receiving a removable medium, comprising the steps of:
 receiving a request to access a drive opening of a media drive;
 determining whether a removable medium is present in said drive opening of the media drive, if not, enabling access to the drive opening to place the removable medium in the medium drive, otherwise denying access to the removable medium to prevent removal of the removable medium from the media drive, wherein the removable medium is selected from the group of a compact disc (CD) disk, a digital versatile disk (DVD) disk, a 5.25 inch disk, or a 3.5 inch disk; and
 requesting a password if access to the removable medium is denied by the security module due to presence of a removable medium in the drive opening of the media drive.

27. The method as described in claim 26, wherein the request is received by pressing a button.

28. The method as described in claim 26, wherein access is controlled by utilizing a component movable between a first position and a second position, wherein tho first position allows access to a drive opening and the second position prevents access to the drive opening; and
 a security module suitable for controlling operation of the movable component.

29. The method as described in claim 26, wherein determining is performed through use of a sensor suitable for detecting a removable medium disposed in the drive opening of the media drive.

30. The method as described in claim 26, wherein a correct password is not entered, the security module prevents a component from moving to a first position enabling access to a drive opening of the media drive from a second position which prevents access to a drive opening of the media drive.

31. An information handling system, comprising:
 at least one processor;
 a memory operably associated with the processor; and a media drive suitable for removable medium, wherein the removable medium is selected from the group of a compact disc (CD) disk, a digital versatile disk (DVD) disk, a 5.25 inch disk, or a 3.5 inch disk, including:
  a drive opening suitable for receiving a removable medium, the removable medium capable of storing electronic data;
  a component movable between a first position and a second position, wherein the first position allows access to a drive opening and the second position prevents access to the drive opening; and
  a security module suitable for controlling operation of the movable component, wherein access is permitted by the security module to the drive opening if a removable medium is not present in the drive opening and access to a removable medium is denied by the security module if a removable medium is present in the drive opening, the security module further suitable for requesting a password if access to the removable medium is denied due to presence of a removable medium in the drive opening.

32. The information handling system as described in claim 31, further comprising a button suitable for actuation by a user to access the drive opening.

33. The information handling system as described in claim 31, wherein the security module includes a sensor suitable for detecting presence of a removable medium in the drive opening.

34. The information handling system as described in claim 31, wherein a correct password is not entered, the security module prevents the component from moving to the first position.

35. A media drive, comprising:
 a drive opening suitable for receiving a removable medium, the removable medium capable of storing electronic data, wherein the removable medium is selected from the group of a compact disc (CD) disk, a digital versatile disk (DVD) disk, a 5.25 inch disk, or a 3.5 inch disk;
 a component movable between a first position and a second position, wherein the first position allows access in a drive opening and the second position prevents access to the drive opening; and
 a security module suitable for controlling operation of the movable component, wherein access is denied by the security module to the drive opening if a removable medium is present in the drive opening and if a password has been set and access is granted by the security module to the drive opening if a user enters a correct password.

36. The media drive of claim 35, wherein access is permitted by the security module to the drive opening if no removable medium is present in the drive opening.

37. The media drive of claim 36, wherein access is permitted by the security module to the drive opening if no password has been set.

38. The media drive of claim 36, wherein a media-eject button is enabled when access is permitted by the security module to the drive opening.

39. The media drive of claim 38, wherein the media-eject button is implemented in software.

40. The media drive of claim 38, wherein the media-eject button is physically located on the outside of a computer housing the media drive.

41. The media drive of claim 35, wherein the drive is locked whenever the user closes a door of the drive with a removable medium in the drive.

42. An information handling system, comprising:
 at least one processor;
 a memory operably associated with the processor; and
 a media drive suitable for removable medium, wherein the removable medium is selected from the group of a compact disc (CD) disk, a digital versatile disk (DVD) disk, a 5.25 inch disk, or a 3.5 inch disk including:
  a drive opening suitable for receiving a removable medium, the removable medium capable of storing electronic data;
  a component movable between a first position and a second position;
  wherein the first position allows access to a drive opening and the second position prevents access to the drive opening; and
  a security module suitable for controlling operation of the movable component, wherein access is denied by the security module to the drive opening if a removable medium is present in the drive opening and if a password has been set, wherein access is permitted by the security module to the drive opening if no removable medium is present in the drive opening and access is permitted by the security module to the drive opening if no password has been set and access granted by the security module to the drive opening if a user enters a correct password.

43. The information handling system of claim 42, wherein a media-eject button is enabled when access is permitted by the security module to the drive opening.

44. The information handling system of claim 43, wherein media-eject button is implemented in software.

45. The information handling system of claim 43, wherein the media-eject button is physically located on the outside of a computer housing the media drive.

46. The information handling system of claim 42, wherein the media drive further comprises a sensor to determine the presence of the removable medium.

47. The information handling system of claim 46, wherein the sensor is photo optical.

48. The information handling system of claim 46, wherein the sensor is capacitive.

49. The information-handling system of claim 42, further comprising the step of locking the media drive whenever the user closes a door of the media drive with the removable medium in the media drive.

50. A method for preventing a medium from being removed from a drive, said method comprising the stops of:
 determining whether a password has been set for accessing the drive, wherein a user may select a security mode for a drive by setting the password for the drive;
 determining whether the medium is in the drive upon reception of an ejection signal from the user, wherein the medium is selected from the group of a compact disc (CD) disk, a digital versatile disk (DVD) disk, a 5.25 inch disk, or a 3.5 inch disk;
 requesting a password if the password has been set for the drive and the medium is in the drive;
 locking the drive to prevent an access to the drive if an incorrect password has been entered; and
 unlocking the drive to allow the access to the drive if a correct password has been entered.

51. The method for preventing a medium from being removed from a drive as in claim 50, further comprising the step of locking the drive whenever a user close a door of the drive with the medium in the drive.

52. The method for preventing a medium from being removed from a drive as in claim 51, further comprising the step of unlocking the drive if a password has not been set for accessing the drive.

* * * * *